(12) United States Patent
Sun et al.

(10) Patent No.: US 12,271,578 B2
(45) Date of Patent: Apr. 8, 2025

(54) AUDIO SHARING METHOD AND APPARATUS, DEVICE AND MEDIUM

(71) Applicant: Beijing Zitiao Network Technology Co., Ltd., Beijing (CN)

(72) Inventors: Hui Sun, Beijing (CN); Daoyu Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/499,903

(22) Filed: Nov. 1, 2023

(65) Prior Publication Data

US 2024/0061560 A1   Feb. 22, 2024

Related U.S. Application Data

(63) Continuation of application No. PCT/CN2022/095845, filed on May 30, 2022.

(30) Foreign Application Priority Data

Jun. 2, 2021  (CN) .......................... 202110615705.4

(51) Int. Cl.
   G06F 3/048    (2013.01)
   G06F 3/0484   (2022.01)
   G06T 11/60    (2006.01)
(52) U.S. Cl.
   CPC ............ *G06F 3/0484* (2013.01); *G06T 11/60* (2013.01); *G06T 2200/24* (2013.01)
(58) Field of Classification Search
   CPC .... G06F 3/0484; G06T 11/60; G06T 2200/24
   See application file for complete search history.

(56) References Cited

U.S. PATENT DOCUMENTS 9,583,142 B1 *  2/2017  Zhu .................... H04N 21/8173
10,835,802 B1 * 11/2020  Mayer ................. H02M 1/4216
(Continued)

FOREIGN PATENT DOCUMENTS

| CN | 103793446 A | 5/2014 |
| CN | 103885962 A | 6/2014 |

(Continued)

OTHER PUBLICATIONS

China National Intellectual Property Administration, Notice of Allowance issued in Chinese Application No. 202110615705.4, Sep. 28, 2022, 5 pages.

(Continued)

*Primary Examiner* — David Phantana-angkool
(74) *Attorney, Agent, or Firm* — Alleman Hall & Tuttle LLP

(57) ABSTRACT

The present disclosure relates to an audio sharing method and apparatus, a device, and a medium. The audio sharing method comprises: displaying a target object in a target interaction interface, the target object comprising an original video using a target audio to be shared as a background music and/or a sharing control of the target audio, and the target audio being a posted audio; when a first trigger operation on the target object is detected, displaying a preset playing interface, the preset playing interface displaying a target video using the target audio as background music, the target video being used for sharing the target audio, and the target video comprising a visual material generated according to the target audio.

18 Claims, 7 Drawing Sheets

(56) References Cited

U.S. PATENT DOCUMENTS

| | | | |
|---|---|---|---|
| 10,998,005 B2 | 5/2021 | He et al. | |
| 11,169,770 B1* | 11/2021 | Venti | H04L 67/146 |
| 11,372,524 B1* | 6/2022 | Tarpey | H04N 21/4826 |
| 11,647,058 B2* | 5/2023 | Abraham | H04L 65/403 709/204 |
| 11,762,052 B1* | 9/2023 | Ganguly | G01S 5/20 367/124 |
| 11,854,538 B1* | 12/2023 | Rozgic | G10L 25/63 |
| 11,893,999 B1* | 2/2024 | Kopuri | G10L 17/04 |
| 2003/0236836 A1* | 12/2003 | Borthwick | G06F 16/40 709/204 |
| 2008/0215979 A1* | 9/2008 | Clifton | G06F 16/40 707/E17.009 |
| 2014/0328570 A1* | 11/2014 | Cheng | G06F 16/43 386/241 |
| 2016/0259497 A1* | 9/2016 | Foss | G06F 3/04842 |
| 2017/0161119 A1* | 6/2017 | Boyle | G06F 16/683 |
| 2018/0374461 A1 | 12/2018 | Serletic et al. | |
| 2019/0020699 A1* | 1/2019 | Ross | H04L 65/1093 |
| 2019/0243954 A1* | 8/2019 | Lyske | G06F 21/6209 |
| 2020/0204880 A1* | 6/2020 | Viswanathan | G11B 27/11 |
| 2020/0387663 A1* | 12/2020 | Viswanathan | G06F 40/166 |
| 2020/0413120 A1* | 12/2020 | Kim | H04N 7/00 |
| 2021/0012761 A1 | 1/2021 | Song | |
| 2021/0026886 A1 | 1/2021 | Song | |
| 2021/0211475 A1* | 7/2021 | Loheide | H04L 65/1069 |
| 2021/0319808 A1* | 10/2021 | Vaucher | H04N 21/8456 |
| 2022/0070501 A1* | 3/2022 | Davis | H04N 21/2743 |
| 2022/0093132 A1 | 3/2022 | Ge | |
| 2022/0114210 A1* | 4/2022 | Kessler | G06F 16/71 |
| 2022/0121623 A1* | 4/2022 | Lyske | G06F 9/52 |
| 2022/0157285 A1 | 5/2022 | Wu et al. | |
| 2022/0279239 A1 | 9/2022 | Wang et al. | |
| 2022/0310125 A1 | 9/2022 | Sun et al. | |
| 2022/0353587 A1 | 11/2022 | Du et al. | |
| 2023/0267145 A1* | 8/2023 | Lin | G06F 16/685 700/94 |
| 2023/0368503 A1* | 11/2023 | Salamon | G06V 10/774 |
| 2023/0376268 A1* | 11/2023 | Carrigan | H04L 65/61 |
| 2024/0013784 A1* | 1/2024 | Chen | G10L 15/08 |
| 2024/0056630 A1* | 2/2024 | Fearn | H04N 21/2668 |

FOREIGN PATENT DOCUMENTS

| | | |
|---|---|---|
| CN | 103945008 A | 7/2014 |
| CN | 109144346 A | 1/2019 |
| CN | 109327608 A | 2/2019 |
| CN | 109451343 A | 3/2019 |
| CN | 109615682 A | 4/2019 |
| CN | 110233976 A | 9/2019 |
| CN | 110798737 A | 2/2020 |
| CN | 110868633 A | 3/2020 |
| CN | 111935537 A | 11/2020 |
| CN | 111970571 A | 11/2020 |
| CN | 112069360 A | 12/2020 |
| CN | 112188266 A | 1/2021 |
| CN | 112449231 A | 3/2021 |
| CN | 112579826 A | 3/2021 |
| CN | 112822563 A | 5/2021 |
| CN | 113365134 A | 9/2021 |
| JP | 2019506065 A | 2/2019 |
| WO | 2019114516 A1 | 6/2019 |
| WO | 2020010814 A1 | 1/2020 |
| WO | 2020216751 A1 | 10/2020 |
| WO | 2021093737 A1 | 5/2021 |

OTHER PUBLICATIONS

China National Intellectual Property Administration, Office action issued in Chinese Application No. 202110615705.4, Apr. 15, 2022, 11 pages.
ISA China National Intellectual Property Administration, International Search Report issued in PCT Application No. PCT/CN2022/095845, Sep. 5, 2022, 11 pages.
European Patent Office, Communication Pursuant to Rules 70(2) and 70a(2) EPC for European Application No. 22815203.9, mailed Oct. 22, 2024, 1 page.
Japan Patent Office, Notice of Reasons for Refusal for Japanese Patent Application No. 2023-574227, mailed on Nov. 5, 2024, 13 pages.
"TikTok Complete Strategy Manual [Edited and Knitted]," note [online], Dec. 21, 2020, [search on Oct. 25, 2024], https://note.com/osamukato/n/na8d8dd14cfe2 , 27 pages.

* cited by examiner

AUDIO SHARING METHOD AND APPARATUS, DEVICE AND MEDIUM

CROSS-REFERENCE TO RELATED APPLICATIONS

The present application is a continuation of International application No. PCT/CN2022/095845 filed on May 30, 2022, which claims the priority to the Chinese patent application No. 202110615705.4 filed on Jun. 2, 2021, and entitled "AUDIO SHARING METHOD AND APPARATUS, DEVICE AND MEDIUM", the disclosure of which is incorporated by reference herein in its entirety.

TECHNICAL FIELD

The present disclosure relates to the technical field of audio processing, and in particular, to an audio sharing method, apparatus, device and medium.

BACKGROUND

With the rapid development of computer technology and mobile communication technology, various video platforms based on electronic devices have been widely applied, so that people's daily lives are greatly enriched.
Currently, when a user hears an interested audio content in a video platform, he/she is willing to share the audio content, but the manner of sharing the content is unitary currently.

SUMMARY

To solve the above technical problem or at least partially solve the above technical problem, the present disclosure provides an audio sharing method, apparatus, device and medium.

In a first aspect, the present disclosure provides an audio sharing method, comprising:
  displaying a target object in a target interaction interface, the target object comprising an original video with a target audio to be shared as background music and/or a sharing control for the target audio, the target audio being a posted audio; and
  when a first trigger operation on the target object is detected, displaying a preset playing interface, a target video with the target audio as background music being displayed in the preset playing interface, the target video being used for sharing the target audio, the target video comprising a visualization material generated according to the target audio.

In a second aspect, the present disclosure provides an audio sharing apparatus, comprising:
  a first display unit configured to display a target object in a target interaction interface, the target object comprising an original video with a target audio to be shared as background music and/or a sharing control for the target audio, the target audio being a posted audio; and
  a second display unit configured to, when a first trigger operation on the target object is detected, display a preset playing interface, a target video with the target audio as background music being displayed in the preset playing interface, the target video being used for sharing the target audio, the target video comprising a visualization material generated according to the target audio.

In a third aspect, the present disclosure provides an electronic device, comprising:
  a processor; and
  a memory configured to store executable instructions,
  wherein the processor is configured to read the executable instructions from the memory and perform the executable instructions to implement the audio sharing method according to the first aspect.

In a fourth aspect, the present disclosure provides a non-transitory computer-readable storage medium having thereon stored a computer program which, when executed by a processor, causes the processor to implement the audio sharing method according to the first aspect.

In a fifth aspect, the present disclosure provides a computer program, comprising instructions which, when executed by a processor, implement the audio sharing method according to the first aspect.

In a sixth aspect, the present disclosure provides a computer program product, comprising a computer program or instructions which, when executed by a processor, implement the audio sharing method according to the first aspect.

Compared with the prior art, the technical solution provided by embodiments of the present disclosure has the following advantages:
  with the audio sharing method, apparatus, device and medium according to the embodiments of the present disclosure, when a user triggers audio sharing of a target audio, a preset playing interface can be directly displayed, a target video with the target audio as background music, that is automatically generated according to the target audio, can be displayed in the preset playing interface, to share the target audio using the target video, which not only can enrich the shared content to meet personalized requirements of the user, but also can lower a threshold for video production, so that the user can conveniently achieve the audio sharing with the video content, without the need of shooting or uploading the video.

BRIEF DESCRIPTION OF THE DRAWINGS

The above and other features, advantages, and aspects of the embodiments of the present disclosure will become more apparent in conjunction with the accompanying drawings and with reference to the following detailed description. Throughout the drawings, identical or similar reference numbers refer to identical or similar elements. It should be understood that the drawings are illustrative and that components and elements are not necessarily drawn to scale.

DETAILED DESCRIPTION

Figure 1:
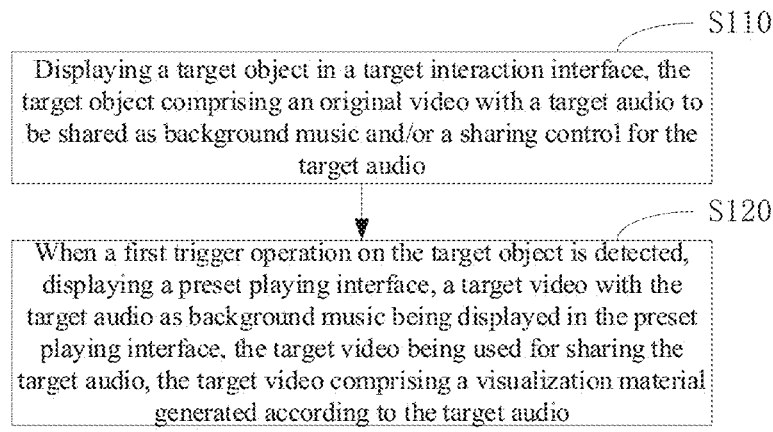
FIG. 1 is a schematic flow diagram of an audio sharing method according to an embodiment of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, and conversely, these embodiments are provided for a more complete and thorough understanding of the present disclosure. It should be understood that the drawings and the embodiments of the present disclosure are for illustration only and are not intended to limit the protection scope of the present disclosure.

It should be understood that the various steps recited in method embodiments of the present disclosure may be performed in a different order, and/or performed in parallel. Moreover, the method embodiments may comprise additional steps and/or omit performing the illustrated steps. The scope of the present disclosure is not limited in this respect.

The term "comprise" and variations thereof used herein are intended to be open-minded, i.e., "comprising but not limited to". The term "based on" is "at least partially based on". The term "one embodiment" means "at least one embodiment"; the term "another embodiment" means "at least one other embodiment"; the term "some embodiments" means "at least some embodiments". Relevant definitions for other terms will be given in the following description.

It should be noted that concepts "first", "second", and the like mentioned in the present disclosure are only used for distinguishing different devices, modules or units, and are not used for limiting the order or interdependence of functions performed by the devices, modules or units.

It should be noted that modifications of "a", "an" or "a plurality of" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustration only, and are not intended to limit the scope of the messages or information.

Currently, when a user hears an interested audio content in a network video platform, if he/she wants to share the audio, he/she generally needs to directly forward the video content or directly privately message music to other users to achieve sharing of the audio content, so that the manner of sharing the content is unitary, and personalized requirements of the user cannot be met.

In order to solve the foregoing problem, the embodiments of the present disclosure provide an audio sharing method, apparatus, device, and medium that can intelligently generate a video for sharing music.

First, the audio sharing method provided by the embodiments of the present disclosure is described in conjunction with FIGS. 1 to 12.

In the embodiments of the present disclosure, the audio sharing method may be executed by an electronic device. The electronic device may include, but is not limited to, a mobile terminal such as a mobile phone, notebook computer, digital broadcast receiver, PDA (Personal Digital Assistant), PAD (tablet computer), PMP (Portable Multimedia Player), vehicle-mounted terminal (e.g., vehicle-mounted navigation terminal), and wearable device, and a fixed terminal such as a digital TV, desktop computer, and smart home device.

FIG. 1 shows a schematic flow diagram of an audio sharing method according to an embodiment of the present disclosure.

As shown in FIG. 1, the audio sharing method may comprise the following steps.

S110, displaying a target object in a target interaction interface, wherein the target object may comprise an original video with a target audio to be shared as background music and/or a sharing control for the target audio.

In the embodiment of the present disclosure, the target interaction interface may be an interface for information exchange between a user and an electronic device, and the target interaction interface may provide information to the user, such as displaying the target object, and may also receive information or an operation inputted by the user, such as receiving an operation of the user on the target object.

In an embodiment of the present disclosure, the target audio may be a record audio recorded by a user who posts the original video, or a song audio, which is not limited here.

In some embodiments, the target object may comprise the original video with the target audio to be shared as the background music.

The original video may be a public video already distributed to other users by the user through a server or a private video already posted by the user and stored in the server. The original video may also be a public video viewed by the user and distributed to the user by other users through the server.

In some other embodiments, the target object may also comprise the sharing control for the target audio.

The sharing control for the target audio may be a control for triggering sharing of the target audio. Specifically, the control may be an object that can be triggered by the user, such as a button or an icon.

S120, when a first trigger operation on the target object is detected, displaying a preset playing interface, a target video with the target audio as background music being displayed in the preset playing interface, the target video being used for sharing the target audio, the target video comprising a visualization material generated according to the target audio.

In the embodiment of the present disclosure, when the user wants to share the target audio related to the target object, he/she may input a first trigger operation on the target object to the electronic device. The first trigger operation may be an operation for triggering sharing the target audio related to the target object. After the first trigger operation on the target object is detected, the electronic device may display the preset playing interface in which the target video with the target audio as the background music is contained. Since the background music of the target video is the target audio, the target video is used for sharing the target audio, that is, the user can achieve sharing the target audio by sharing the target video.

In an embodiment of the present disclosure, the target video may be automatically generated according to the target audio.

Further, the target video may comprise the visualization material that is automatically generated according to the target audio. The visualization material is a video element which can be viewed in the target video.

Optionally, the visualization material may comprise an image and/or text generated according to associated information of the target audio, which will be described in detail below.

In an embodiment of the present disclosure, when the user triggers the audio sharing of the target audio, the preset playing interface can be directly displayed, in which the target video with the target audio as the background music, that is automatically generated according to the target audio, can be displayed, to share the target audio by using the target video, which not only can enrich the shared content to meet personalized requirements of the user, but also can lower a threshold for video production, so that the user can conveniently achieve the audio sharing with the video content, without the need of shooting or uploading the video.

In another implementation of the present disclosure, in order to improve convenience of sharing the target audio by the user, a plurality of trigger manners of sharing the target audio may be provided for the user.

In some embodiments of the present disclosure, the target interaction interface may comprise an audio presentation interface, and the target object may comprise the sharing control for the target audio.

The audio presentation interface may be an interface for presenting the associated information of the target audio, for example, a music detail page interface for the target audio.

Optionally, the associated information of the target audio may comprise at least one of an audio cover of the target audio, a poster avatar of the target audio, audio style information of the target audio, lyrics of the target audio, a performer name of the target audio, an audio name of the target audio, or a video cover of a posted public video of which background music is the target audio.

Further, the target object may be displayed in the audio presentation interface of the target audio, and at this time, the target object may be the sharing control for the target audio. For example, the sharing control for the target audio may be a sharing button for the target audio or a sharing icon for the target audio.

In these embodiments, optionally, the first trigger operation may comprise a gesture control operation (e.g., a tap, long press, double-tap, etc.), a voice control operation, or an expression control operation on the sharing control for the target audio.

Figure 2:
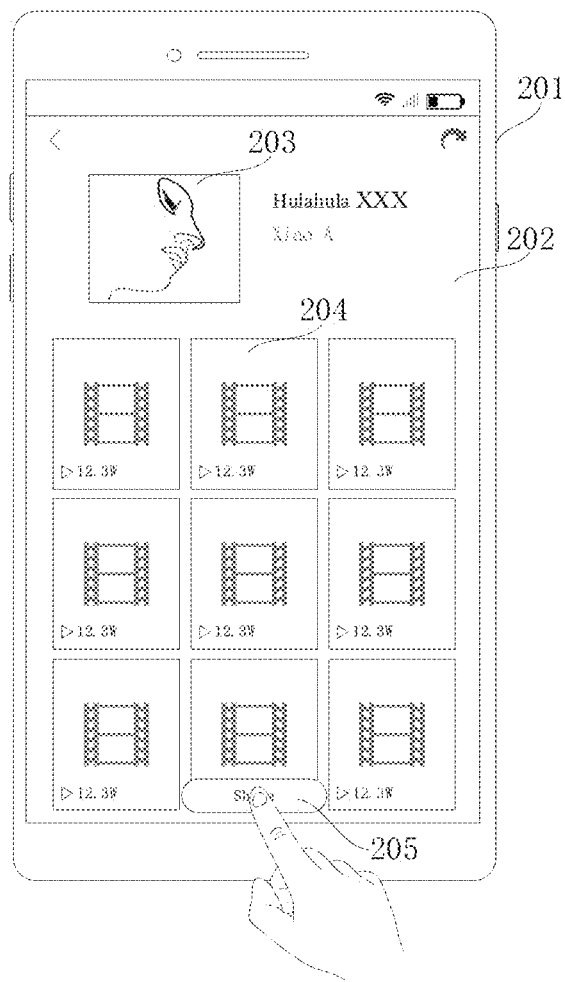
FIG. 2 is a schematic diagram of an interaction for triggering audio sharing according to an embodiment of the present disclosure.

FIG. 2 shows a schematic diagram of an interaction for triggering audio sharing according to an embodiment of the present disclosure.

As shown in FIG. 2, an electronic device 201 displays a music detail page interface 202 for a song "Hulahula XXX" sung by Xiao A, in which an audio cover 203 of the "Hulahula XXX", an audio name "Hulahula XXX", a performer name "Xiao A", and a video cover 204 of a posted public video with the "Hulahula XXX" as background music are displayed. At the same time, in the music detail page interface 202 is also displayed a "share" button 205, which is a sharing button for the "Hulahula XXX". The user may tap the "share" button 205 in the music detail page interface 202 to achieve sharing the song "Hulahula XXX". At this time, the electronic device 201 may automatically generate a video with the "Hulahula XXX" as background music.

In these embodiments, optionally, before the S110, the audio sharing method may further comprise:
  displaying in a video playing interface the original video with the target audio as the background music and an audio presentation control for the target audio.
  Accordingly, S110 may specifically comprise:
  when a second trigger operation on the audio presentation control is detected, displaying the audio presentation interface, in which the sharing control for the target audio is displayed.

Specifically, the electronic device may play the original video in the video playing interface, and display in the video playing interface the audio presentation control for the target audio which is the background music of the original video, and when the user is interested in the target audio, he/she may input the second trigger operation on the audio presentation control for the target audio to the electronic device. The second trigger operation may be an operation for triggering entering the audio presentation interface for the target audio. The electronic device may, after the second trigger operation on the audio presentation control is detected, display the audio presentation interface including the sharing control for the target audio, so that the user can, in the audio presentation interface, input the first trigger operation on the sharing control for the target audio to trigger sharing the target audio.

The audio presentation control may be used for presenting at least one of the lyrics of the target audio, the performer name of the target audio, or the audio name of the target audio.

In other embodiments of the present disclosure, the target interaction interface may comprise a video playing interface, wherein the target object may comprise the original video, the target object may comprise the original video with the target audio as background music.

The video playing interface may be an interface for playing the original video. Further, in the video playing interface for the original video, the target object may be displayed, and at this time, the target object may comprise the original video.

In these embodiments, the first trigger operation may comprise a trigger operation on the original video.

In some embodiments, the first trigger operation may comprise a function popup window trigger operation for triggering popping-up and displaying a function popup window, such as a gesture control operation (e.g., a tap, long press, double-tap, etc.), a voice control operation, or an expression control operation on the original video, and a sharing trigger operation for triggering sharing the target audio, such as a gesture control operation (e.g., a tap, long press, double-tap, etc.), a voice control operation, or an expression control operation on a sharing button in the function popup window. Namely, the user needs to trigger displaying the function popup window in the video playing interface first, and then achieves triggering sharing the target audio based on the sharing button in the function popup window.

In some other embodiments, the first trigger operation may comprise a sharing trigger operation for triggering sharing the target audio, such as a gesture control operation (e.g. a tap, long press, double-tap, etc.), a voice control operation, or an expression control operation on the original video. Namely, the user can directly achieve triggering sharing the target audio in the video playing interface.

In still other embodiments of the present disclosure, the target interaction interface may comprise the video playing interface, the target object may comprise the original video, and the original video may comprise an audio control for the target audio, for example, an audio sticker.

The video playing interface may be an interface for playing the original video. Further, the target object may be displayed in the video playing interface for the original video, and at this time, the target object may comprise the original video, and the audio sticker of the target audio may be displayed on a video picture of the original video played in the video playing interface.

The audio sticker may be used for presenting at least one of the lyrics of the target audio, the performer name of the target audio, or the audio name of the target audio.

In these embodiments, the first trigger operation may comprise a trigger operation on the audio sticker.

In some embodiments, the first trigger operation may comprise a function popup window trigger operation for triggering popping up and displaying a function popup window, such as a gesture control operation (e.g., a tap, long press, double-tap, etc.), a voice control operation, or an expression control operation on the audio sticker, and a sharing trigger operation for triggering sharing the target audio, such as a gesture control operation (e.g., a tap, long press, double-tap, etc.), a voice control operation, or an expression control operation on a sharing button in the function popup window. Namely, the user needs to trigger displaying the function popup window in the video playing interface first, and then achieves triggering sharing the target audio based on the sharing button in the function popup window.

Figure 3:
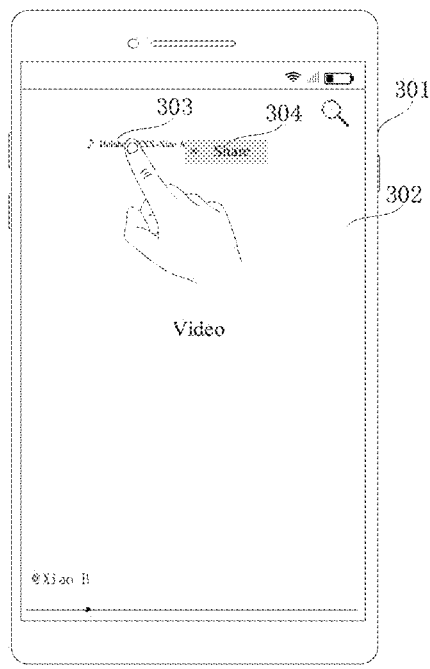
FIG. 3 is a schematic diagram of another interaction for triggering audio sharing according to an embodiment of the present disclosure.

FIG. 3 shows a schematic diagram of another interaction for triggering audio sharing according to an embodiment of the present disclosure.

As shown in FIG. 3, an electronic device 301 displays a video playing interface 302 for a video posted by Xiao B, of which background music is a song "Hulahula XXX". When the user is interested in the song "Hulahula XXX", he/she can long press a song control 303 for the song "Hulahula XXX". At this time, the electronic device 301 may display a function popup window 304, in which a "share" button that is a sharing button for the "Hulahula XXX" may be displayed. The user can tap the "share" button to achieve sharing the song "Hulahula XXX". At this time, the electronic device 301 may automatically generate a video with the "Hulahula XXX" as background music.

In some other embodiments, the first trigger operation may comprise a sharing trigger operation for triggering sharing the target audio, such as a gesture control operation (e.g., a tap, long press, double-tap, etc.), a voice control operation, or an expression control operation on the audio sticker. Namely, the user can directly achieve triggering sharing the target audio in the video playing interface.

In still other embodiments of the present disclosure, the target interaction interface may comprise the video playing interface, and the target object may comprise the original video and the sharing control for the target audio.

The video playing interface may be an interface for playing the original video. Further, the original video and the target object may be displayed in the video playing interface for the original video, and at this time, the target object may comprise the sharing control for the target audio, and the sharing control for the target audio may be displayed at any position in the video playing interface.

In these embodiments, the first trigger operation may comprise a trigger operation on the sharing control.

Specifically, the first trigger operation may comprise a sharing trigger operation for triggering sharing the target audio, such as a gesture control operation (e.g., a tap, long press, double-tap, etc.), a voice control operation, or an expression control operation on the sharing control for the target audio. Namely, the user can directly achieve triggering sharing the target audio in the video playing interface.

In still another embodiment of the present disclosure, the visualization material may comprise image and/or text generated according to the associated information of the target audio.

The associated information of the target audio may comprise at least one of an audio cover of the target audio, a poster avatar of the target audio, audio style information of the target audio, audio content information of the target audio, lyrics of the target audio, a performer name of the target audio, an audio name of the target audio, or a music theory characteristic of the target audio.

In some embodiments of the present disclosure, the visualization material may comprise a first visualization material, and at this time, the first visualization material may comprise the image generated according to the associated information, the associated information may comprise an associated image of the target audio, and the associated image may comprise at least one of an audio cover or a poster avatar.

In some embodiments, under the condition that the target audio is a song audio, the associated image may comprise the audio cover.

In some other embodiments, under the condition that the target audio is a record audio recorded by a user who posts the original video, the associated image may comprise the poster avatar.

Optionally, the first visualization material may comprise at least one of:

1. a background material, comprising an image generated according to an image feature of the associated image.

The background material is a dynamic or static background image with the image feature of the associated image.

Optionally, the image feature may comprise at least one of a color feature, a brightness feature, or a saturation feature.

In some examples, taking an example that the image feature comprises the color feature, the electronic device may, after the first trigger operation on the target object is detected, first extract a color with a greatest number of pixels or a color with a number of pixels greater than a preset number threshold in the associated image of the target audio, then select from the extracted colors a color falling within a preset color gamut, and generate a pure-color or gradient-color background image corresponding to the background material according to the selected color, and further generate a target video based on the background material.

It should be noted that the preset number threshold and the preset color gamut may be set according to the requirements of the user, which are not limited here.

In other examples, taking an example that the image feature comprises the saturation feature, after the electronic device detects the first trigger operation on the target object, if it is determined after performing saturation detection on the associated image of the target audio that the associated image only includes colors in a Morandi color system, that is, colors in the associated image all are gray-series colors with low saturation, the electronic device may generate a pure-color or gradient-color background image corresponding to the background material based on the colors of the Morandi color system, and further generate a target video based on the background material.

Further, the background material is displayed in a first picture area of the target video.

Optionally, the first picture area of the target video may be at least part of a picture area of the target video, which is not limited here.

Under the condition that the first picture area is the entire picture area of the target video, the background material may be a background image covering the entire picture area of the target video.

Under the condition that the first picture area is part of the picture area of the target video, the background material may be a background image covering the part of the picture area of the target video.

2. A foreground material, comprising the associated image or an image generated according to an image feature of the associated image.

The foreground material is a dynamic or static foreground image located over the background material.

In some embodiments, the foreground material may be the associated image of the target audio.

Specifically, the electronic device may, after the first trigger operation on the target object is detected, directly use the associated image of the target audio as the foreground image corresponding to the foreground material, and further generate a target video based on the foreground material.

In some other embodiments, the foreground material may be a foreground image generated according to the image feature of the associated image of the target audio.

Optionally, the image feature may comprise at least one of a color feature, a brightness feature, or a saturation feature.

In some examples, taking an example that the image feature comprises the color feature, the electronic device may, after the first trigger operation on the target object is detected, first extract a color with a greatest number of pixels or a color with a number of pixels greater than a preset number threshold in the associated image of the target audio, then select from the extracted colors a color falling within a preset color gamut, and generate a gradient-color foreground image corresponding to the foreground material according to the selected color, and further generate a target video based on the foreground material.

It should be noted that the preset number threshold and the preset color gamut may be set according to the requirements of the user, which are not limited here.

Further, the foreground material is displayed in a second picture area of the target video.

Optionally, the second picture area of the target video may be at least part of the picture area of the target video, which is not limited here.

Under the condition that the second picture area is the entire picture area of the target video, the foreground material may be a foreground image covering the entire picture area of the target video.

Under the condition that the second picture area is part of the picture area of the target video, the foreground material may be a foreground image covering the part of the picture area of the target video.

In an embodiment of the present disclosure, the electronic device may generate the target video according to one of the foreground material or the background material alone, or may generate the target video according to both the foreground material and the background material.

Under the condition that the electronic device generates the target video only according to the foreground material, the first picture area may be a background display area of the target video, and at least part of the second picture area may be included in the first picture area, such that the target video includes a canvas-type content formed by the foreground image corresponding to the foreground material.

Under the condition that the electronic device generates the target video according to the foreground material and the background material, at least part of the second picture area can be included in the first picture area, so that at least part of the foreground material can cover the background material, such that the target video includes a canvas-type content formed by the foreground image corresponding to the foreground material and the background image corresponding to the background material.

Figure 4:
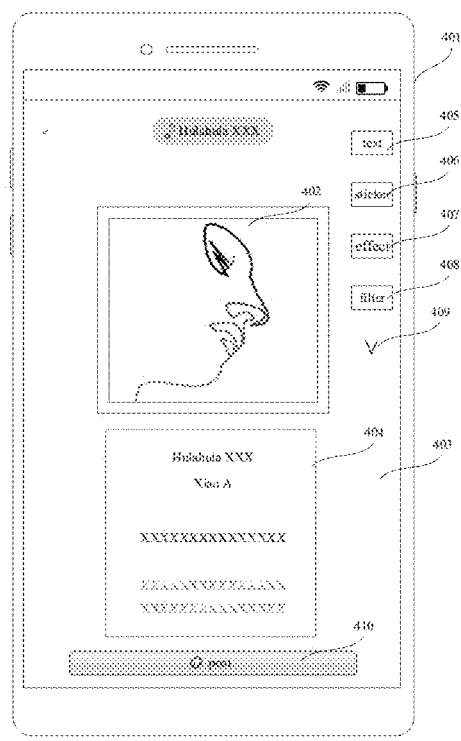
FIG. 4 is a schematic interface diagram of a preset playing interface according to an embodiment of the present disclosure.

FIG. 4 shows a schematic interface diagram of a preset playing interface according to an embodiment of the present disclosure.

As shown in FIG. 4, an electronic device 401 displays a preset playing interface, in which a target video automatically generated based on a song "Hulahula XXX" may be displayed. In the target video are displayed a foreground picture and a background picture, the foreground picture being a song cover 402 of the song "Hulahula XXX", the background picture being a pure-color background image 403 generated according to a color feature of the song cover 402.

In some other embodiments of the present disclosure, the visualization material may comprise a second visualization material, which may comprise a background image selected in a material library and matched with the associated information. At this time, the associated information may comprise an audio label of the target audio.

The second visualization material may be an image matched with the audio label of the target audio.

Optionally, the second visualization material may comprise a static or dynamic background image selected in the material library and matched with the audio label of the target audio.

Specifically, the electronic device may, after the first trigger operation on the target object is detected, acquire the audio label of the target audio, which may be a label for characterizing an audio style, audio type and cover type, then search images pre-stored in the material library for an image with the audio label, and further randomly select from the searched images at least one image as a background image corresponding to the second visualization material, and further generate a target video based on the second visualization material, so that the background image corresponding to the second visualization material in the target video is matched with styles such as an atmosphere, type, and emotion of the target audio and a cover image of the target audio.

Further, the audio label of the target audio may comprise a label marked in advance, and the audio label of the target audio may also comprise a label obtained by detecting the audio content of the target audio and/or the cover image of the target audio. The label obtained by detecting the audio content is used for characterizing the audio type or the audio style, and the label obtained by detecting the cover image of the target audio is used for characterizing the cover style.

Further, the second visualization material may be displayed in the first picture area of the target video, wherein the first picture area has already been described above and is not repeated here.

Figure 5:
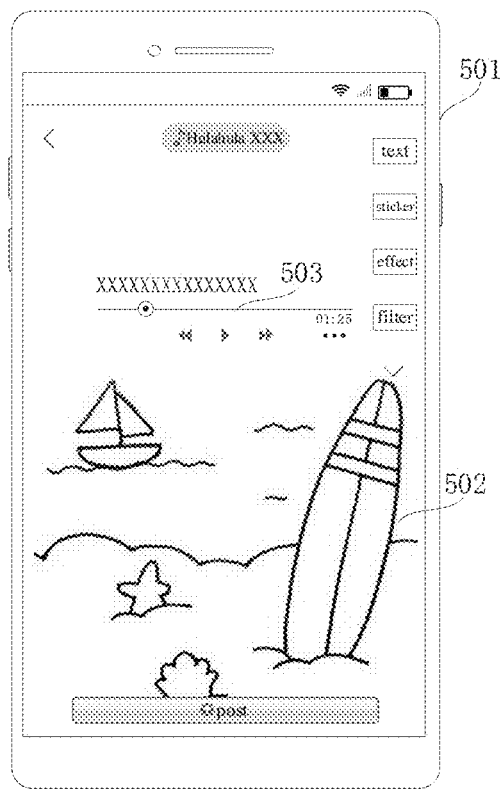
FIG. 5 is a schematic interface diagram of another preset playing interface according to an embodiment of the present disclosure.

FIG. 5 shows a schematic interface diagram of another preset playing interface according to an embodiment of the present disclosure.

As shown in FIG. 5, an electronic device 501 displays a preset playing interface, in which a target video automatically generated based on a song "Hulahula XXX" may be displayed. A background image 502 conforming to a song style of the song "Hulahula XXX" is displayed in the target video.

In still other embodiments of the present disclosure, the visualization material may comprise a third visualization material, which may have an animation effect generated according to the associated information.

The associated information may comprise a music theory characteristic of the target audio. The music theory characteristic may comprise a characteristic feature of the target audio that is related to music theory, such as a rhythm feature, drumbeat feature, tone feature, and timbre feature.

Further, the animation effect may comprise a dynamic-element shape, a dynamic-element color, a dynamic-element transformation manner, a background color, and the like, which conform to the music theory characteristic of the target audio.

Specifically, the electronic device may, after the first trigger operation on the target object is detected, detect the music theory characteristic of the target audio first, and then input the detected music theory characteristic of the target audio into an animation effect generation model obtained by pre-training, and further obtain a background image corresponding to the third visualization material, wherein the background image corresponding to the third visualization material may comprise an animation effect generated according to the music theory characteristic.

Further, the third visualization material may be displayed in the first picture area of the target video, wherein the first picture area has already been described above and is not repeated here.

Figure 6:
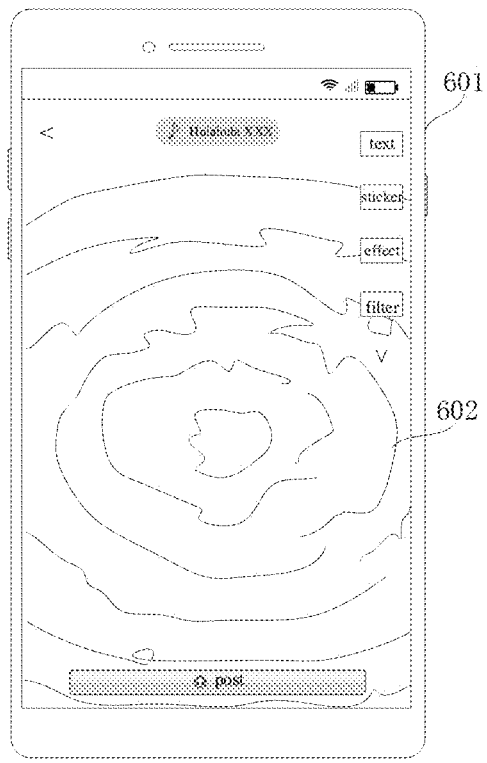
FIG. 6 is a schematic interface diagram of still another preset playing interface according to an embodiment of the present disclosure.

FIG. 6 shows a schematic interface diagram of another preset playing interface according to an embodiment of the present disclosure.

As shown in FIG. 6, an electronic device 601 displays a preset playing interface, in which a target video automatically generated based on a song "Hulahula XXX" may be displayed. A background dynamic effect 602 conforming to a music theory characteristic of the song "Hulahula XXX" is displayed in the target video.

In these embodiments, optionally, the electronic device may first perform timbre detection and rhythm detection on the target audio to obtain the timbre feature and the rhythm feature of the target audio, and determine a musical instrument corresponding to the timbre feature, and further input the rhythm feature into an animation effect generation model pre-trained corresponding to the musical instrument, and further obtain a background image corresponding to the third visualization material, wherein the background image corresponding to the third visualization material may comprise an animation effect that the musical instrument is played based on the rhythm feature.

For example, the electronic device, after performing timbre detection on the target audio, if determining that the target audio is accompanied by a piano, the animation effect generated according to the music theory characteristic can also be a piano being played, and a rhythm of rise and fall of keys of the piano is the same as that of the target audio.

In still other embodiments of the present disclosure, the visualization material may comprise a fourth visualization material, which may comprise the associated information.

The associated information may comprise audio text of the target audio, and the audio text may comprise at least one of first text information associated with the target audio and second text information obtained by performing speech recognition on the target audio.

Specifically, the fourth visualization material may comprise audio text displayed in a form of a sticker.

In some embodiments, the first text information may comprise at least one of the performer name or the audio name.

Under the condition that the target audio does not carry lyrics, the electronic device may, after the first trigger operation on the target object is detected, acquire the performer name and the audio name, and generate a lyric sticker corresponding to the fourth visualization material according to the performer name and the audio name, and further generate a target video based on the fourth visualization material.

In some other embodiments, under the condition that the target audio carries lyrics, the first text information may further comprise the lyrics.

Under the condition that the target audio carries the lyrics, the electronic device may, after the first trigger operation on the target object is detected, directly acquire the lyrics, the performer name and the audio name, and generate a lyric sticker corresponding to the fourth visualization material according to the lyrics, the performer name and the audio name, and further generate a target video based on the fourth visualization material.

In still other embodiments, under the condition that the target audio does not carry lyrics, the second text information may comprise lyrics obtained by performing speech recognition on the audio content of the target audio.

Under the condition that the target audio does not carry lyrics, the electronic device may, after the first trigger operation on the target object is detected, acquire the performer name and the audio name, and automatically recognize lyrics of the target audio by using an audio-text conversion technology, then generate a lyric sticker corresponding to the fourth visualization material according to the lyrics, the performer name and the audio name, and then generate a target video based on the fourth visualization material.

Continually referring to FIG. 4, an audio sticker 404 may also be displayed in the target video. Continually referring to FIG. 5, an audio sticker 503 may also be displayed in the target video.

In still other embodiments of the present disclosure, the visualization material may further comprise a plurality of sequence images sequentially displayed with a preset time interval.

In some embodiments, the preset time interval may be determined according to an audio duration of the target audio and a number of the sequence images.

Specifically, the electronic device may, after selecting the plurality of sequence images, divide the audio duration of the target audio by the number of the sequence images to obtain the preset time interval between two sequence images, and further generate a target video based on the plurality of sequence images, so that in the target video, the sequence images can be sequentially presented in a sequence order, and the preset time interval can be provided between every two sequence images.

The sequence image may be a plurality of background materials, a plurality of foreground materials, a plurality of second visualization materials, or a plurality of third visualization materials, which is not limited here.

In some other embodiments, the preset time interval may be determined according to an audio rhythm of the target audio.

Specifically, the electronic device may, after selecting the plurality of sequence images, determine a number of times the beat needs to be synchronized according to the number of the sequence images, then select rhythm downbeats of the number according to the audio rhythm of the target audio, and then use a time interval between every two rhythm downbeats as the preset time interval, and further generate a target video based on the plurality of sequence images, so that in the target video, the sequence images can be sequentially presented in a sequence order, and the preset time interval can be provided between every two sequence images.

The sequence image may be a plurality of background materials, a plurality of foreground materials, a plurality of second visualization materials, or a plurality of third visualization materials, which is not limited here.

In another implementation of the present disclosure, in order to further lower a threshold for video creation, a simpler and more convenient video editing function may be provided for the user.

In these embodiments, the preset playing interface may also be used for editing the target video.

Optionally, the preset playing interface may be a video editing interface.

In some embodiments of the present disclosure, after the step S120, the audio sharing method may further comprise:
when a video capture operation on the target video is detected, using a video clip selected by the video capture operation in the target video as a captured target video.

The video capture operation can comprise a trigger operation on a video capture mode, a selection operation on the video clip and a confirmation operation on the selection result.

Specifically, the trigger operation on the video capture mode may comprise a gesture control operation (e.g., a tap, long press, double-tap, etc.), a voice control operation, or an expression control operation on a video capture control for triggering entering into the video capture mode. The selection operation on the video clip comprises a gesture control operation (e.g., dragging, a tap, etc.), a voice control operation, or an expression control operation on at least one of a start time node or an end time node on a duration selection control for selecting a start time and an end time of the video clip. The confirmation operation on the selection result may comprise a gesture control operation (e.g., a tap, long press, double-tap, etc.), a voice control operation, or an expression control operation on a confirmation control for triggering capturing the video.

Continually referring to FIG. 4, in the preset playing interface may be displayed a pull-down button 409, which may be used for displaying a function button not currently displayed, such as a video capture button. The user may tap the pull-down button 409 to cause the electronic device 401 to display the video capture button, and then tap the video capture button to cause the electronic device to display a video capture interface shown in FIG. 7.

Figure 7:
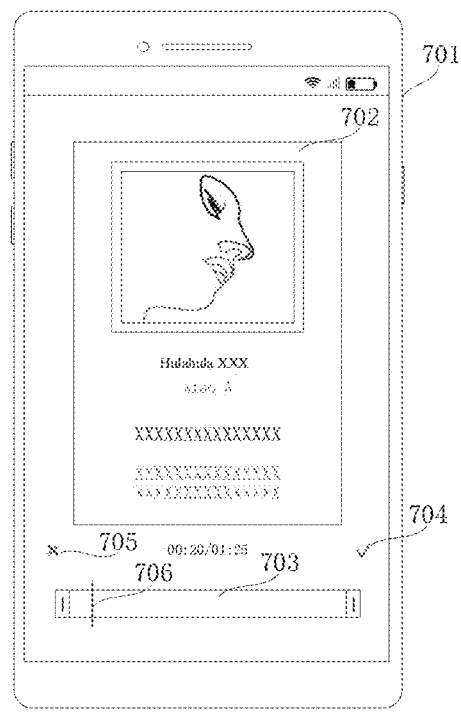
FIG. 7 is a schematic diagram of an interaction for video capture according to an embodiment of the present disclosure.

FIG. 7 shows a schematic diagram of an interaction for video capture according to an embodiment of the present disclosure.

As shown in FIG. 7, in a video capture interface 701, a preview window 702 of the target video, a duration selection panel 703, a confirmation icon 704, and a cancellation icon 705 are displayed. The user may drag a start time node 706 on the duration selection panel 703 to select a video frame corresponding to the start time of the video clip. In the process that the user drags the start time node 706, the video frame displayed in the preview window 702 changes with a timestamp corresponding to the start time node 706. The user may, after confirming that the video capture is completed, tap the confirmation icon 704, so that the electronic device uses the video clip selected by the user as the captured target video and displays the captured target video in the preset playing interface shown in FIG. 4. When the user does not want to capture the video, he/she may tap the cancellation icon 705 to cause the electronic device to return to display the preset playing interface shown in FIG. 4, and cause the electronic device to keep displaying the target video before entering the video capture interface 701.

In some embodiments of the present disclosure, after the step S120, the audio sharing method may further comprise: when a material modification operation on the visualization material is detected, performing material modification on the visualization material according to a material modification method corresponding to the material modification operation.

In an embodiment of the present disclosure, both presentation forms and material contents of various visualization materials can be modified.

The material modification method may comprise at least one of the following:
1. modifying the material content of the visualization material.

The modifying the material content of the visualization material may comprise replacing an image in the visualization material, changing text in the visualization material, adding a new visualization material (e.g. adding a new sticker and text), and deleting an existing visualization material (e.g. deleting any existing image, sticker, and text).

The material modification operation may comprise a selection operation on an image to be replaced, an editing operation on text to be changed, an addition operation on a visualization material, and a deletion operation on the visualization material.

Continually referring to FIG. 4, in the preset playing interface may be displayed a text button 405, a sticker button 406, an effect button 407, and a filter button 408. The text button 405 may be used for adding new text, the sticker button 406 may be used for adding a new sticker, the effect button 407 may be used for adding an effect for the target video, and the filter button 408 may be used for adding a filter for the target video.

Figure 8:
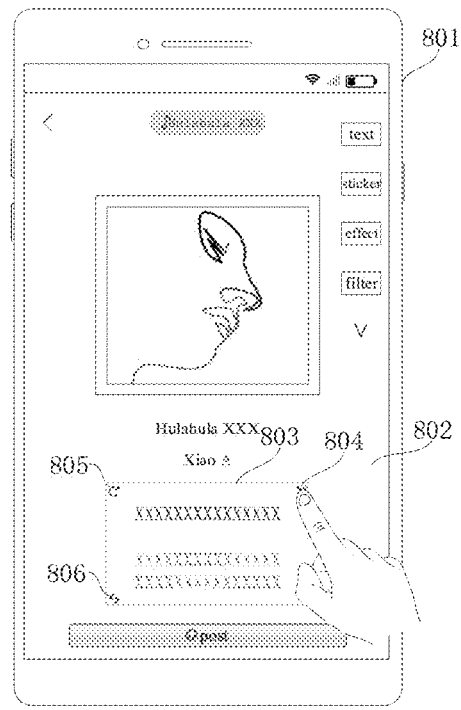
FIG. 8 is a schematic diagram of an interaction for material modification according to an embodiment of the present disclosure.

FIG. 8 shows a schematic diagram of an interaction for material modification according to an embodiment of the present disclosure.

As shown in FIG. 8, an electronic device 801 may display a preset playing interface 802, a target video may be displayed in the preset playing interface 802, the target video may have a lyric sticker 803, and the user can tap the lyric sticker 803 to cause a deletion icon 804 to be displayed thereon. The user can tap the deletion icon 804 to delete the lyric sticker 803.

Figure 9:
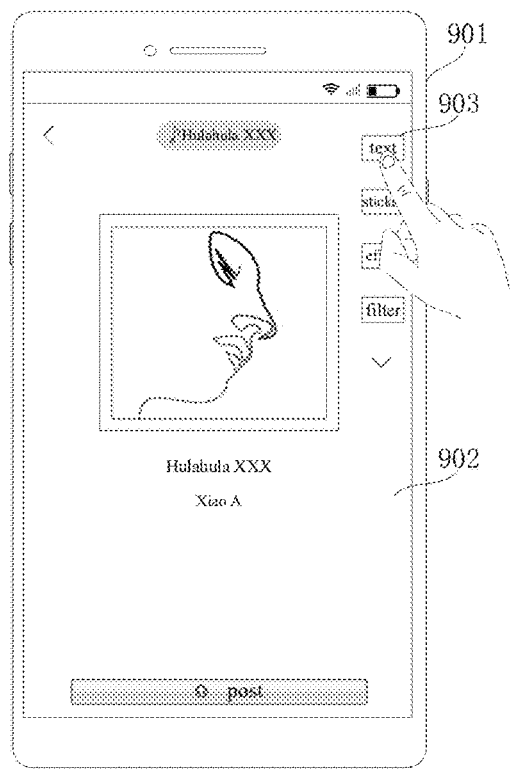
FIG. 9 is a schematic diagram of another interaction for material modification according to an embodiment of the present disclosure.

FIG. 9 shows a schematic diagram of another interaction for material modification according to an embodiment of the present disclosure.

As shown in FIG. 9, an electronic device 901 may display a preset playing interface 902, a target video may be displayed in the preset playing interface 902, and a text button 903 may also be displayed in the preset playing interface 902. The user may tap the text button 903 to cause the electronic device 901 to display a preset playing interface shown in FIG. 10.

Figure 10:
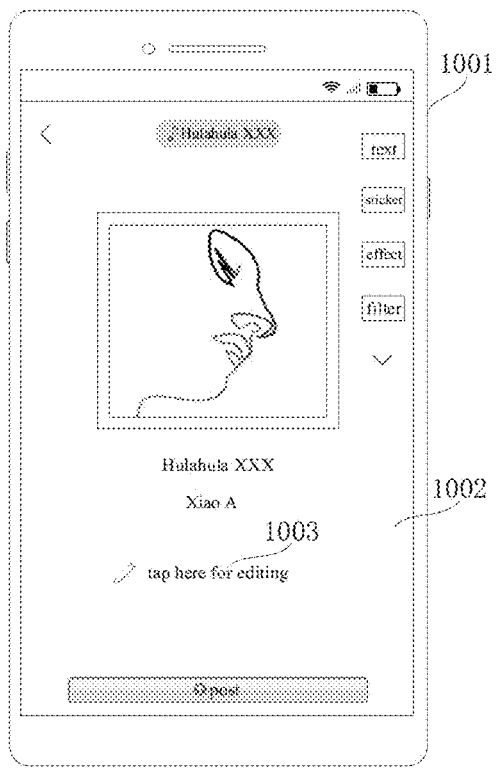
FIG. 10 is a schematic diagram of still another interaction for material modification according to an embodiment of the present disclosure.

FIG. 10 shows a schematic diagram of still another interaction for material modification according to an embodiment of the present disclosure.

As shown in FIG. 10, an electronic device 1001 may display a preset playing interface 1002, a target video may be displayed in the preset playing interface 1002, the target video may have a newly added text box 1003. The user may edit text that is desired to be newly added in the text box 1003.

2. modifying a material style of the visualization material.

The modifying the material style of the visualization material may comprise modifying a presentation form of the visualization material.

Taking an example that the visualization material is a sticker, the sticker can have different presentation forms, e.g., with a border, without a border, wide border, narrow border, and the like. Taking an example that the visualization material is an image, the image may have different presentation forms, e.g., with a border, without a border, wide border, narrow border, and the like. Taking an example that the visualization material is a lyric sticker, the lyric sticker can have different presentation forms, e.g., different lyric scrolling forms, different player shapes, and the like.

Continually referring to FIG. 8, the electronic device 801 may display the preset playing interface 802, the target video may be displayed in the preset playing interface 802, and the target video may have the lyric sticker 803. The user can long press the lyric sticker 803 to change a presentation form of the lyric sticker 803. Each time the user long presses the lyric sticker 803, the lyric sticker 803 changes the presentation form once according to a preset changing sequence of the presentation form.

Continually referring to FIG. 8, the electronic device 801 may display the preset playing interface 802, the target video may be displayed in the preset playing interface 802, and the target video may have the lyric sticker 803. The user may also tap the lyric sticker 803 to cause a refresh icon 806 to be displayed thereon. The user can tap the refresh icon 806 to change the presentation form of the lyric sticker 803. Each time the user taps the refresh icon 806, the lyric sticker 803 changes the presentation form once according to the preset changing sequence of the presentation form.

3. modifying a display size of the visualization material.

Specifically, the user may perform a gesture operation of zooming in or zooming out on a visualization material desired to be modified, so that a display size of the visualization material changes according to the operation manner of the gesture operation.

4. modifying a display position of the visualization material.

Specifically, the user can drag a visualization material desired to be moved, so that a display position of the visualization material changes following the dragging operation of the user, and the visualization material is finally displayed at a position where the user stops the dragging operation.

5. modifying a display angle of the visualization material.

The display angle refers to a rotation angle of the visualization material.

Continually referring to FIG. 8, the electronic device 801 may display the preset playing interface 802, the target video may be displayed in the preset playing interface 802, and the target video may have the lyric sticker 803. The user may also tap the lyric sticker 803 to cause a rotation icon 805 to be displayed thereon. The user can tap the rotation icon 805 to change a rotation angle of the lyric sticker 803.

In order to enable the user to interact with other users in the target video, an embodiment of the present disclosure further provides another audio sharing method.

Figure 11:
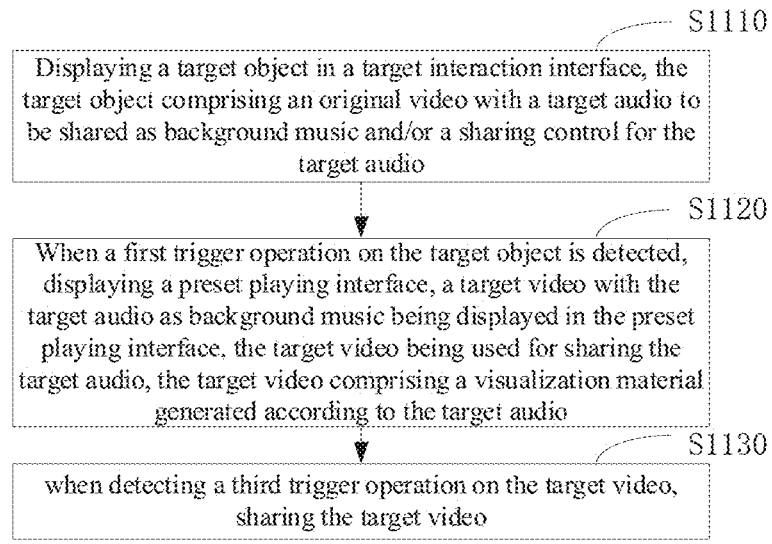
FIG. 11 is a schematic flow diagram of another audio sharing method according to an embodiment of the present disclosure.

FIG. 11 shows a schematic flow diagram of another audio sharing method according to an embodiment of the present disclosure.

As shown in FIG. 11, the audio sharing method may comprise the following steps.

S1110, displaying a target object in a target interaction interface, the target object comprising an original video with a target audio to be shared as background music and/or a sharing control for the target audio.

The target audio is a posted audio.

S1120, when a first trigger operation on the target object is detected, displaying a preset playing interface, a target video with the target audio as background music being displayed in the preset playing interface, the target video being used for sharing the target audio, the target video comprising a visualization material generated according to the target audio.

The steps S1110 to S1120 are similar to the steps S110 and S120 in the above embodiment, which are not repeated here.

S1130, when a third trigger operation on the target video is detected, sharing the target video.

In an embodiment of the present disclosure, when a user confirms that the target video conforms to his/her desired effect, he/she may input the third trigger operation to an electronic device. The third trigger operation may be an operation for triggering sharing the target video. The electronic device may, after the third trigger operation on the target video is detected, share the target video.

In some embodiments of the present disclosure, the third trigger operation may comprise a gesture control operation (e.g., as a tap, long press, double-tap, etc.), a voice control operation, or an expression control operation on the target video.

In some other embodiments of the present disclosure, the third trigger operation may further comprise a gesture control operation (e.g., a tap, long press, double-tap, etc.), a voice control operation, or an expression control operation on a sharing control for the target video. The sharing control for the target video may be a control for triggering sharing the target video. Specifically, the control may be an object such as a button and an icon that can be triggered by the user.

In an embodiment of the present disclosure, the sharing the target video may comprise at least one of:

1. posting the target video in a first application to which the target interaction interface belongs.

The first application may be any type of application.

For example, the first application may be a short-video application to which the target interaction interface belongs, and the sharing the target video may specifically be posting the target video in the short-video application to which the target interaction interface belongs, so that the target video may be distributed to other users using the short-video application or stored as a private video in a server for the short-video application.

Continually referring to FIG. 4, a "post" button 410 may be displayed in the preset playing interface, so that when the user wants to share a finally edited target video, he/she may tap the "post" button 410 to post the target video as a daily video.

2. posting the target video in a second application other than the first application.

The second application may be any type of other applications than the first application to which the target interaction interface belongs.

For example, the second application may be a social application other than the short-video application to which the target interaction interface belongs, and the sharing the target video may specifically be posting the target video into a social platform for the social application.

3. sending the target video to at least one target user.

The sharing the target video may specifically be sending the target video to a chat interface for chatting between the user and at least one target user in the first application, to a chat interface for chatting between the user and at least one target user in the second application, or to a communication account of at least one target user through an instant messaging tool.

Therefore, in the embodiments of the present disclosure, the sharing the target video can be achieved in various forms, so that the user can post the target video as a normal work to harvest positive feedbacks of others such as viewing and interaction.

Figure 12:
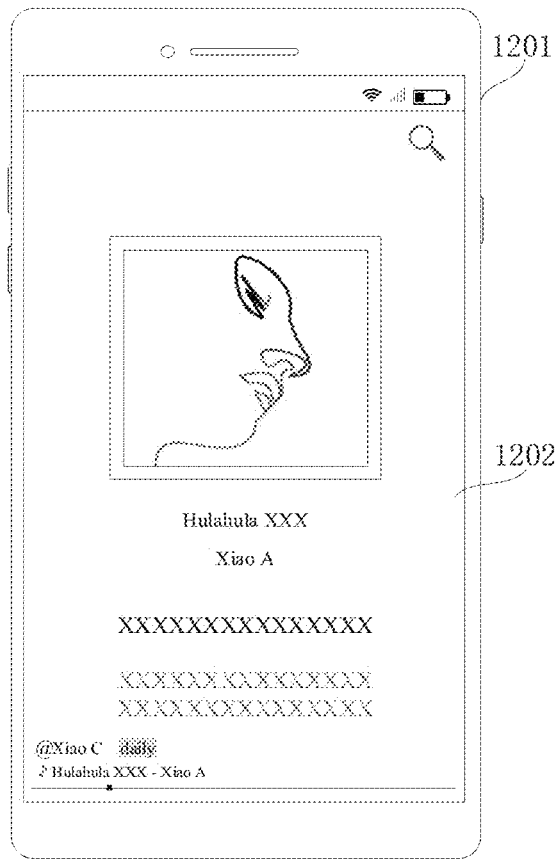
FIG. 12 is a schematic diagram of a playing interface for a target video according to an embodiment of the present disclosure.

FIG. 12 shows a schematic diagram of a playing interface for a target video according to an embodiment of the present disclosure.

As shown in FIG. 12, an electronic device 1201 displays a video playing interface, in which a target video 1202 automatically generated based on a song "Hulahula XXX" and finally edited and posted by Xiao C can be displayed.

In some other embodiments of the present disclosure, after the step S1130, the audio sharing method may further comprise:
under the condition that interaction information for the target video is received, overlay-displaying an interaction information presentation control on the target video, wherein the interaction information presentation control may be generated according to the interaction information.

Specifically, a user viewing the target video can post interaction information for the target video in the video playing interface of the target video, and a server can, after receiving the interaction information for the target video, send the interaction information for the target video to an electronic device of the user posting the target video, to enable the electronic device to generate, according to the interaction information, the interaction information presentation control for the target video that can present the interaction information for the target video, so that the user posting the target video can, in the target video, check the interaction information that the user viewing the target video interacts with he/she.

Optionally, the interaction information presentation control can be used for interacting with an information sender of the interaction information.

Specifically, the user posting the target video can, for his/her interested interaction information, perform interaction such as like and comment with the information sender of the interaction information in the interaction information presentation control.

To sum up, with the audio sharing method provided by the embodiments of the present disclosure, the target video in various presentation forms can be intelligently generated according to the target audio, and a simple and easy-to-operate video editing manner is provided, so that a threshold for video production is lowered, and even if a creation capability of a sharer is insufficient, he/she can also produce a high-level video to cause the produced video to reach his/her desired sharing effect. At the same time, after the user shares the target audio by using the intelligently generated target video, he/she can use the target audio in the target video as a public expression to gain viewing and interaction, so that the user experience is improved.

An embodiment of the present disclosure further provides an audio sharing apparatus, which is described below with reference to FIG. 13.

In the embodiment of the present disclosure, the audio sharing apparatus may be an electronic device. The electronic device may comprise, but is not limited to, a mobile terminal such as a mobile phone, notebook computer, digital broadcast receiver, PDA, PAD, PMP, vehicle-mounted terminal (e.g., vehicle-mounted navigation terminal), and wearable device, and a fixed terminal such as a digital TV, desktop computer, and smart home device.

Figure 13:
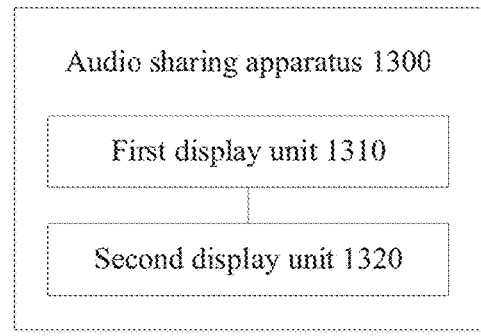
FIG. 13 is a schematic structural diagram of an audio sharing apparatus according to an embodiment of the present disclosure.

FIG. 13 shows a schematic structural diagram of an audio sharing apparatus according to an embodiment of the present disclosure.

As shown in FIG. 13, the audio sharing apparatus 1300 may comprise a first display unit 1310 and a second display unit 1320.

The first display unit 1310 may be configured to display a target object in a target interaction interface, the target object comprising an original video with a target audio to be shared as background music and/or a sharing control for the target audio, the target audio being a posted audio.

The second display unit 1320 may be configured to, when a first trigger operation on the target object is detected, display a preset playing interface, a target video with the target audio as background music being displayed in the preset playing interface, the target video being used for sharing the target audio, the target video comprising a visualization material generated according to the target audio.

In the embodiment of the present disclosure, when a user triggers audio sharing of the target audio, the preset playing interface can be directly displayed, in which the target video with the target audio as the background music, automatically generated according to the target audio, can be displayed, to share the target audio by using the target video, which not only can enrich the shared content to meet personalized requirements of the user, but also can lower a threshold for video production, so that the user can conveniently achieve the audio sharing with the video content, without the need of shooting or uploading the video.

In some embodiments of the present disclosure, the visualization material may comprise an image and/or text generated according to associated information of the target audio.

In some embodiments of the present disclosure, the visualization material may comprise a first visualization material, wherein the first visualization material may comprise the image generated according to the associated information, the associated information may comprise an associated image of the target audio, and the associated image may comprise at least one of an audio cover or a poster avatar.

In some embodiments of the present disclosure, the first visualization material may comprise at least one of:

a background material, which comprises an image generated according to an image feature of the associated image, and is displayed in a first picture area of the target video; or a foreground material, which comprises the associated image or an image generated according to the image feature of the associated image, and is displayed in a second picture area of the target video, wherein at least part of the second picture area is contained in the first picture area, and the first picture area is a background display area for the target video.

In some embodiments of the present disclosure, the visualization material may comprise a second visualization material, wherein the second visualization material may comprise a background image selected from a material library and matched with the associated information, and the associated information may comprise an audio label of the target audio.

In some embodiments of the present disclosure, the visualization material may comprise a third visualization material, wherein the third visualization material may have an animation effect generated according to the associated information, and the associated information may comprise a music theory characteristic of the target audio.

In some embodiments of the present disclosure, the visualization material may comprise a fourth visualization material, wherein the fourth visualization material may comprise the associated information, and the associated information may comprise audio text of the target audio.

The audio text may comprise at least one of first text information associated with the target audio or second text information obtained by performing speech recognition on the target audio.

In some embodiments of the present disclosure, the visualization material may comprise a plurality of sequence images sequentially displayed with a preset time interval.

The preset time interval may be determined according to an audio duration of the target audio and a number of the sequence images, or according to an audio rhythm of the target audio.

In some embodiments of the present disclosure, the preset playing interface may also be used for editing the target video.

The audio sharing apparatus 1300 may further comprise a first processing unit, which may be configured to, after the preset playing interface is displayed, when detecting a video capture operation on the target video, use a video clip selected by the video capture operation in the target video as a captured target video.

In some embodiments of the present disclosure, the preset playing interface may also be used for editing the target video.

The audio sharing apparatus 1300 may further comprise a second processing unit, which may be configured to, after the preset playing interface is displayed, when a material modification operation on the visualization material is detected, perform material modification on the visualization material according to a material modification method corresponding to the material modification operation.

The material modification method may comprise at least one of: modifying a material content of the visualization material, modifying a material style of the visualization material, modifying a display size of the visualization material, modifying a display position of the visualization material, or modifying a display angle of the visualization material.

In some embodiments of the present disclosure, the target interaction interface may comprise an audio presentation interface, and the target object may comprise the sharing control for the target audio.

The audio sharing apparatus 1300 may further comprise a third display unit, which may be configured to, before the target object is displayed, display, in a video playing interface, the original video with the target audio as the background music and an audio presentation control for the target audio.

The first display unit can be further configured to, when a second trigger operation on the audio presentation control is detected, display an audio presentation interface in which the sharing control is displayed.

In some embodiments of the present disclosure, the target interaction interface may comprise the video playing interface, the target object may comprise the original video with the target audio as the background music, and the first trigger operation may comprise a trigger operation on the original video.

Or, the target interaction interface may comprise the video playing interface, the target object may comprise the original video, the original video may comprise an audio control for the target audio, and the first trigger operation may comprise a trigger operation on the audio control.

Or, the target interaction interface may comprise the video playing interface, the target object may comprise the original video and the sharing control for the target audio, and the first trigger operation may comprise a trigger operation on the sharing control.

In some embodiments of the present disclosure, the audio sharing apparatus 1300 may further comprise a video sharing unit, which may be configured to, after the preset playing interface is displayed, when a third trigger operation on the target video is detected, share the target video.

The sharing the target video may comprise at least one of: posting the target video in a first application to which the target interaction interface belongs, posting the target video in a second application other than the first application, or sending the target video to at least one target user.

It should be noted that the audio sharing apparatus 1300 shown in FIG. 13 can perform each step in the method embodiments shown in FIG. 1 to FIG. 12, and implement each process and effect in the method embodiments shown in FIG. 1 to FIG. 12, which are not repeated here.

An embodiment of the present disclosure further provides an electronic device, which may comprise a processor and a memory configured to store executable instructions. The processor may be configured to read the executable instructions from the memory and execute the executable instructions to implement the audio sharing method in the foregoing embodiments.

Figure 14:
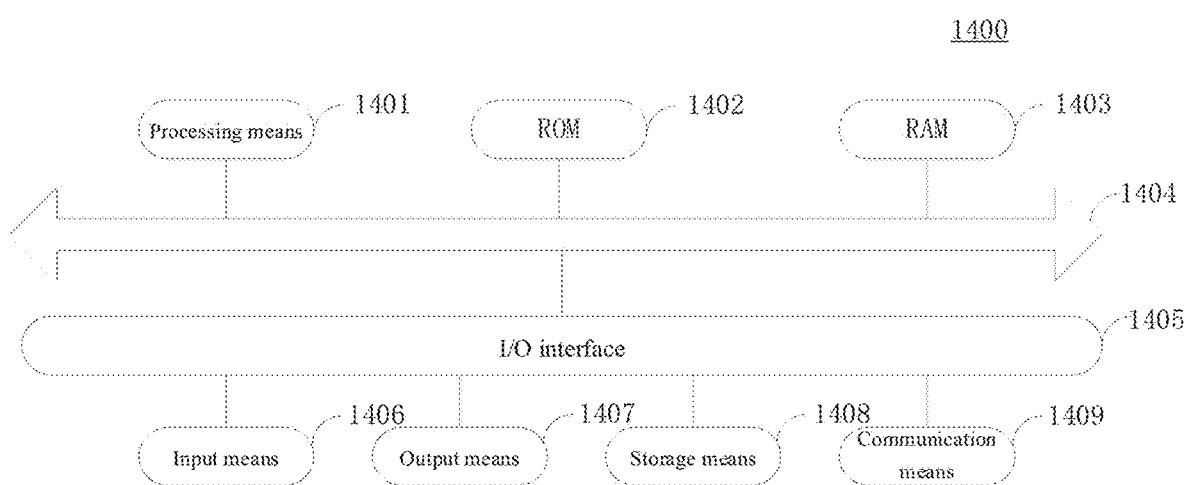
FIG. 14 is a schematic structural diagram of an electronic device according to an embodiment of the present disclosure.

FIG. 14 shows a schematic structural diagram of an electronic device according to an embodiment of the present disclosure. Referring specifically to FIG. 14, a schematic structural diagram of an electronic device 1400 suitable for implementing the embodiments of the present disclosure is shown.

The electronic device 1400 in the embodiment of the present disclosure may be an electronic device. The electronic device may comprise, but is not limited to, a mobile terminal such as a mobile phone, notebook computer, digital broadcast receiver, PDA, PAD, PMP, vehicle-mounted terminal (e.g., vehicle-mounted navigation terminal), and wearable device, and a fixed terminal such as a digital TV, desktop computer, and smart home device.

It should be noted that the electronic device 1400 shown in FIG. 14 is only an example, and should not bring any limitation to the functions and the use scope of the embodiments of the present disclosure.

As shown in FIG. 14, the electronic device 1400 may comprise a processing means (e.g., a central processing unit, a graphics processing unit, etc.) 1401, which can perform various appropriate actions and processes according to a program stored in a read-only memory (ROM) 1402 or a program loaded from a storage means 1408 into a random access memory (RAM) 1403. In the RAM 1403, various programs and data required for the operation of the electronic device 1400 are also stored. The processing means 1401, the ROM 1402, and the RAM 1403 are connected to each other via a bus 1404. An input/output (I/O) interface 1405 is also connected to the bus 1404.

Generally, the following means may be connected to the I/O interface 1405: an input means 1406 including, for example, a touch screen, touch pad, keyboard, mouse, camera, microphone, accelerometer, gyroscope, etc.; an output means 1407 including, for example, a liquid crystal display (LCD), a speaker, a vibrator, etc.; a storage means 1408 including, for example, a magnetic tape, hard disk, etc.; and a communication means 1409. The communication means 1409 may allow the electronic device 1400 to communicate with other devices in a wireless or wired manner to exchange data. While FIG. 14 illustrates the electronic device 1400 having the various means, it should be understood that not all illustrated means are required to be implemented or provided. More or fewer means may be alternatively implemented or provided.

An embodiment of the present disclosure further provides a non-transitory computer-readable storage medium having thereon stored a computer program which, when executed by a processor, causes the processor to implement the audio sharing method in the foregoing embodiments.

In particular, according to the embodiments of the present disclosure, the processes described above with reference to the flow diagrams may be implemented as a computer software program. For example, an embodiment of the present disclosure comprises a computer program product, the computer program product comprising a computer program carried on a non-transitory computer-readable medium, the computer program containing program code for performing the method illustrated by the flow diagrams. In such an embodiment, the computer program may be downloaded from a network via the communications means 1409 and installed, or installed from the storage means 1408, or installed from the ROM 1402. The computer program performs, when executed by the processing means 1401, the above functions defined in the audio sharing method of the embodiment of the present disclosure.

It should be noted that the above computer-readable medium of the present disclosure may be a computer-readable signal medium or a computer-readable storage medium or any combination of the above two. The computer-readable storage medium may be, for example, but not limited to, an electrical, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that can contain, or store a program for use by or in conjunction with an instruction execution system, apparatus, or device. In the present disclosure, the computer-readable signal medium may comprise a data signal propagated in baseband or as part of a carrier wave, in which computer-readable program code is carried. Such a propagated data signal may take a variety of forms, including but not limited to, an electromagnetic signal, optical signal, or any suitable combination of the forgoing. The computer-readable signal medium may be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: an electrical wire, optical cable, RF (radio frequency), etc., or any suitable combination of the foregoing.

In some embodiments, a client and a server may communicate using any currently known or future developed network protocol, such as HTTP, and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be embodied in the above electronic device; or may exist separately without being assembled into the electronic device.

The above computer-readable medium has thereon carried one or more programs which, when executed by the electronic device, cause the electronic device to perform: displaying a target object in a target interaction interface, the target object comprising an original video with an target audio to be shared as background music and/or a sharing control for the target audio, the target audio being a posted audio; when a first trigger operation on the target object is detected, displaying a preset playing interface, a target video with the target audio as background music being displayed in the preset playing interface, the target video being used for sharing the target audio, the target video comprising a visualization material generated according to the target audio.

In the embodiments of the present disclosure, the computer program code for performing the operations of the present disclosure may be written in one or more programming languages or a combination thereof, which include but are not limited to an object-oriented programming language such as Java, Smalltalk, C++, and include a conventional procedural programming language, such as the "C" language or similar programming languages. The program code may be executed entirely on a user's computer, partly on the user's computer, as a stand-alone software package, partly on the user's computer and partly on a remote computer, or entirely on the remote computer or server. In a scenario in which a remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which comprises one or more executable instructions for implementing a specified logical function. It should also be noted that, in some alternative implementations, functions noted in blocks may occur in an order different from that noted in the drawings. For example, two blocks shown in succession may, in fact, be executed substantially concurrently, or the blocks may sometimes be executed in a reverse order, which depends upon the functions involved. It will also be noted that each block of the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved units described in the embodiments of the present disclosure may be implemented by software or hardware. The name of the unit does not, in some cases, constitute a limitation on the unit itself.

The functions described above herein may be performed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, the machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

An embodiment of the present disclosure further provides a computer program, comprising instructions which, when executed by a processor, implement the audio sharing method in the foregoing embodiments.

An embodiment of the present disclosure further provides a computer program product, comprising a computer program or instructions which, when executed by a processor, implements the audio sharing method in the foregoing embodiments.

The foregoing description is only illustration of preferred embodiments of the present disclosure and the technical principles used. It should be appreciated by those skilled in the art that the disclosed scope involved in the present disclosure is not limited to a technical solution formed by the specific combination of the above technical features, but also should encompass another technical solution formed by an arbitrary combination of the above technical features or their equivalent features without departing from the above disclosed concept, for example, a technical solution formed by replacing the above features and technical features having similar functions disclosed in the present disclosure (but not limited thereto) with each other.

Furthermore, while operations are depicted in a specific order, this should not be understood as requiring that these operations be performed in the specific order shown or in a sequential order. Under certain circumstances, multitasking and parallel processing may be advantageous. Likewise, while several specific implementation details are included in the above discussion, these should not be construed as limitations on the scope of the present disclosure. Certain features that are described in the context of separate embodiments can also be implemented in combination in a single embodiment. Conversely, various features that are described in the context of a single embodiment can also be implemented separately or in any suitable sub-combination in multiple embodiments.

Although the subject matter has been described in language specific to structural features and/or method logical actions, it should be understood that the subject matter defined in the attached claims is not necessarily limited to the specific features or actions described above. Conversely, the specific features and actions described above are only exemplary forms for implementing the claims.

What is claimed is:

1. An audio sharing method, comprising:

displaying a target object in a target interaction interface, the target object comprising at least one of an original video with a target audio or a sharing control for the target audio, the target audio being background music of the original video, and the target audio being a posted audio; and in response to a first triggering on the target object, acquiring a visualization material automatically generated according to the target audio, displaying a preset playing interface, and displaying a target video with the target audio as background music in the preset playing interface, the target video being configured for sharing the target audio and comprising the visualization material, wherein the visualization material comprises at least one of:

a first visualization material, the first visualization material comprising an image generated according to first associated information of the target audio, the first associated information comprising an associated image of the target audio; or a second visualization material, the second visualization material comprising a background image selected from a material library and matched with second associated information of the target audio, the second associated information comprising an audio label of the target audio.

2. The method according to claim 1, wherein the visualization material further comprises text generated according to associated information of the target audio.

3. The method according to claim 1, wherein the associated image comprises at least one of an audio cover or a poster avatar.

4. The method according to claim 1, wherein the first visualization material comprises at least one of:
- a background material, which comprises an image generated according to an image feature of the associated image, and is displayed in a first picture area of the target video; or
- a foreground material, which comprises the associated image or an image generated according to the image feature of the associated image, and is displayed in a second picture area of the target video,
- wherein at least part of the second picture area is contained in the first picture area, and the first picture area is a background display area for the target video.

5. The method according to claim 1, wherein the visualization material comprises a third visualization material, the third visualization material having an animation effect generated according to third associated information of the target audio, the third associated information comprising a music theory characteristic of the target audio.

6. The method according to claim 2, wherein the visualization material comprises a fourth visualization material, the fourth visualization material comprising fourth associated information of the target audio, the fourth associated information comprising audio text of the target audio.

7. The method according to claim 6, wherein the audio text comprises at least one of first text information associated with the target audio or second text information obtained by performing speech recognition on the target audio.

8. The method according to claim 1, wherein the visualization material comprises a plurality of sequence images sequentially displayed with a preset time interval.

9. The method according to claim 8, wherein the preset time interval is determined according to an audio duration of the target audio and a number of the sequence images, or according to an audio rhythm of the target audio.

10. The method according to claim 1, wherein the preset playing interface is further configured for editing the target video,
- wherein after the displaying the preset playing interface, the method further comprises:
  - in response to a video capturing on the target video, using a video clip selected by the video capturing in the target video as a captured target video.

11. The method according to claim 1, wherein the preset playing interface is further configured for editing the target video,
- wherein after the displaying the preset playing interface, the method further comprises:
  - in response to a material modifying on the visualization material, performing material modification on the visualization material according to a material modification method corresponding to the material modifying.

12. The method according to claim 11, wherein the material modification method comprises at least one of: modifying a material content of the visualization material, modifying a material style of the visualization material, modifying a display size of the visualization material, modifying a display position of the visualization material, or modifying a display angle of the visualization material.

13. The method according to claim 1, wherein the target interaction interface comprises an audio presentation interface, the target object comprising the sharing control for the target audio,
- wherein before the displaying the target object in the target interaction interface, the method further comprises:
  - displaying, in a video playing interface, the original video with the target audio as the background music and an audio presentation control for the target audio,
- wherein the displaying the target object in the target interaction interface comprises:
  - in response to a second triggering on the audio presentation control, displaying the audio presentation interface, in which the sharing control is displayed.

14. The method according to claim 1, wherein the target interaction interface comprises a video playing interface, the target object comprising the original video with the target audio as the background music, the first triggering comprising a triggering on the original video;
- or, the target interaction interface comprises the video playing interface, the target object comprising the original video, the original video comprising an audio control for the target audio, the first triggering comprising a triggering on the audio control;
- or, the target interaction interface comprises the video playing interface, the target object comprising the original video and the sharing control for the target audio, the first triggering comprising a triggering on the sharing control.

15. The method according to claim 1, wherein after the displaying the preset playing interface, the method further comprises:
- in response to a third triggering on the target video, sharing the target video.

16. The method according to claim 15, wherein the sharing the target video comprises at least one of: posting the target video in a first application to which the target interaction interface belongs, posting the target video in a second application other than the first application, or sending the target video to at least one target user.

17. An electronic device, comprising:
- a processor; and
- a memory configured to store executable instructions,
- wherein the processor is configured to read the executable instructions from the memory, and execute the executable instructions to:
  - display a target object in a target interaction interface, the target object comprising at least one of an original video with a target audio or a sharing control for the target audio, the target audio being background music of the original video, and the target audio being a posted audio; and
  - in response to a first triggering on the target object, acquire a visualization material automatically generated according to the target audio, display a preset playing interface, and display a target video with the target audio as background music in the preset playing interface, the target video being configured for sharing the target audio and comprising the visualization material,
- wherein the visualization material comprises at least one of:
  - a first visualization material, the first visualization material comprising an image generated according to first associated information of the target audio, the first associated information comprising an associated image of the target audio; or
  - a second visualization material, the second visualization material comprising a background image selected from a material library and matched with second associated information of the target audio, the second associated information comprising an audio label of the target audio.

18. A non-transitory computer-readable storage medium, wherein the computer-readable storage medium has thereon stored a computer program which, when executed by a processor, causes the processor to:

display a target object in a target interaction interface, the target object comprising at least one of an original video with a target audio or a sharing control for the target audio, the target audio being background music of the original video, and the target audio being a posted audio; and in response to a first triggering on the target object, acquire a visualization material automatically generated according to the target audio, display a preset playing interface, and display a target video with the target audio as background music in the preset playing interface, the target video being configured for sharing the target audio and comprising the visualization material, wherein the visualization material comprises at least one of:

a first visualization material, the first visualization material comprising an image generated according to first associated information of the target audio, the first associated information comprising an associated image of the target audio; or a second visualization material, the second visualization material comprising a background image selected from a material library and matched with second associated information of the target audio, the second associated information comprising an audio label of the target audio.

\* \* \* \* \*